United States Patent
Koch et al.

(10) Patent No.: US 8,769,942 B2
(45) Date of Patent: Jul. 8, 2014

(54) EXHAUST MANIFOLD FOR AN INTERNAL COMBUSTION ENGINE

(75) Inventors: Guenter Koch, Augsburg (DE); Stefan Ehrmann, Fichtenau (DE); Johanna Goldstein, Altomuenster (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 29 days.

(21) Appl. No.: 13/572,276

(22) Filed: Aug. 10, 2012

(65) Prior Publication Data

US 2012/0297756 A1   Nov. 29, 2012

Related U.S. Application Data

(63) Continuation of application No. PCT/EP2011/000076, filed on Jan. 11, 2011.

(30) Foreign Application Priority Data

Feb. 13, 2010  (DE) .......................... 10 2010 007 877

(51) Int. Cl.
  *F01N 3/00*   (2006.01)
  *F01N 3/02*   (2006.01)
  *F01N 3/20*   (2006.01)
  *F01N 1/00*   (2006.01)

(52) U.S. Cl.
  USPC ............................................. 60/324; 60/323

(58) Field of Classification Search
  USPC .................................................... 60/323, 324
  See application file for complete search history.

(56) References Cited

U.S. PATENT DOCUMENTS

| 3,864,908 | A | * | 2/1975 | LaHaye | 60/272 |
| 4,182,122 | A | * | 1/1980 | Stratton et al. | 60/322 |
| 4,966,567 | A | * | 10/1990 | Breckenfeld et al. | 440/89 R |
| 5,761,905 | A | * | 6/1998 | Yamada et al. | 60/322 |
| 6,055,806 | A | * | 5/2000 | Dalton | 60/272 |
| 6,155,045 | A | * | 12/2000 | Durr et al. | 60/323 |
| 8,429,906 | B2 | * | 4/2013 | Rippert | 60/323 |
| 2010/0162692 | A1 | * | 7/2010 | Rippert | 60/323 |

FOREIGN PATENT DOCUMENTS

| DE | 89 14 153.9 U1 | 3/1990 |
| DE | 43 15 086 A1 | 11/1994 |
| DE | 298 18 763 U1 | 2/1999 |
| DE | 199 38 359 B4 | 4/2008 |
| EP | 0 715 064 A1 | 6/1996 |
| EP | 0 719 915 A1 | 7/1996 |
| EP | 1 614 872 A2 | 1/2006 |

OTHER PUBLICATIONS

Corresponding International Search Report with English Translation dated Apr. 6, 2011 (four (4) pages).
German Search Report with English Translation (nine (9) pages).

* cited by examiner

*Primary Examiner* — Thomas Denion
*Assistant Examiner* — Dapinder Singh
(74) *Attorney, Agent, or Firm* — Crowell & Moring LLP

(57) ABSTRACT

An exhaust manifold for an internal combustion engine has at least one exhaust pipe and a flange which can be fastened to an engine block of the internal combustion engine. On the side facing away from the engine block, the flange is provided with a channel which is connected to a fluid line and which is in fluid communication with the interior of the exhaust pipe via a lateral opening in the exhaust pipe. The fluid line opens into the channel on the side of the flange that faces away from the engine block.

9 Claims, 2 Drawing Sheets

EXHAUST MANIFOLD FOR AN INTERNAL COMBUSTION ENGINE

CROSS-REFERENCE TO RELATED APPLICATIONS

This application is a continuation of PCT International Application No. PCT/EP/2011/000076, filed Jan. 11, 2011, which claims priority under 35 U.S.C. §119 from German Patent Application No. DE 10 2010 007 877.8, filed Feb. 13, 2010, the entire disclosures of which are herein expressly incorporated by reference.

BACKGROUND AND SUMMARY OF THE INVENTION

The invention relates to an exhaust manifold for an internal combustion engine, having at least one exhaust pipe and a flange which can be fastened to an engine block of the internal combustion engine. On the side facing away from the engine block, the flange is provided with a channel which is connected to a fluid line and which is in fluid communication with the interior of the exhaust pipe via a lateral opening in the exhaust pipe.

It is often desirable to feed secondary air to an exhaust system of the internal combustion engine, for the purpose of which an introduction of fluid into the exhaust pipes of the internal combustion engine is required. Because of the high temperature differences existing between the individual components, especially between the engine block and the exhaust pipes, high technical expenditures are required for creating a tight long-lasting connection.

An above-described exhaust manifold is known, for example, from German Patent document DE 43 15 086 A1. In the case of the exhaust manifold shown in DE 43 15 086 A1, the secondary air is introduced by way of the engine block into the flange and from there into the exhaust pipes. For this purpose, corresponding fluid connections have to be created between the engine block and the flange. This approach requires high technical expenditures and costs.

It is an object of the invention to present a cost-effective alternative for the introduction of fluid into the exhaust system.

In the case of an exhaust manifold of the above-mentioned type, it is provided for this purpose according to the invention that the fluid line leads into the channel on the side of the flange facing away from the engine block. In this manner, connections from the channel to the interior of the engine block will no longer be necessary. With the exception of the lead-through openings of the exhaust pipes, the flange can therefore be constructed to be closed on the engine block side. The introduction of fluid, for example, secondary air, into the channel as well as the introduction of the fluid from the channel into the exhaust pipe or the exhaust pipes takes place on the side of the flange facing away from the engine block.

The channel may be in direct fluid communication with the interior of the exhaust pipes. As an alternative, the fluid may first flow into the air gap of an LSI manifold and then into the exhaust pipes.

In a preferred embodiment of the invention, the channel is formed by a sheet metal component and extends along a flange surface, which is situated opposite the flange surface that rests on the engine block. The sheet metal preferably is a separate second part which is connected with the flange, for example, by welding or the like. Since the flange rests against the engine block, thus, for example, against the cooled cylinder head, the temperature differences occurring there during operation are clearly lower than in the area of the exhaust pipes. For this reason, a connection of the sheet metal component with the flange is subjected to less severe temperature fluctuations and is therefore subject to different, less extensive, thermal expansions. The use of an otherwise customary compensation element between the individual components will therefore not be necessary.

The sheet metal component forming the channel preferably has an essentially U-shaped cross-sectional profile, the legs of the profile pointing to the flange surface. The volume of the channel can be defined in a simple manner by way of the length of the legs and the width of the preferably flat connecting web between the latter, in which case a relatively large volume requiring little space can also be implemented.

The sheet metal component forming the channel preferably has an attachment for the connection to the fluid line, for example, in the form of a molded-on connecting piece.

The channel can be constructed such that all exhaust pipes extending through the flange lead through the channel or, in other words, are at least partially surrounded by the channel. The channel may extend along the entire width of the cylinder head. As a result, each of the exhaust pipes can easily be supplied with the fluid, for example, with secondary air.

The opening in the exhaust pipe is, for example, formed by a lateral slot.

The exhaust pipes may be surrounded by an outer shell of an air gap insulation, which also takes place in the case of a known LSI manifold. However, the invention can also be used in exactly the same manner in the case of exhaust manifolds without any air gap insulation.

When an air gap insulation is used, the sheet metal component forming the channel is preferably arranged within the outer shell.

The exhaust pipe or pipes may extend through the flange.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
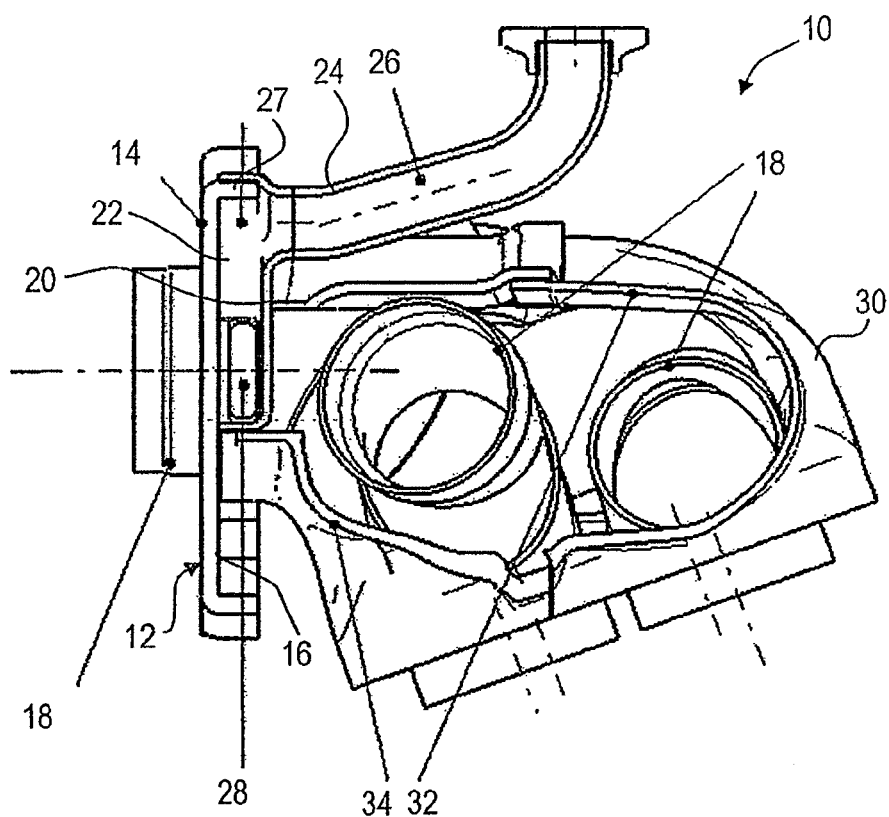
FIG. 1 is a schematic perspective view of an exemplary exhaust manifold according to the invention.
Figure 2:
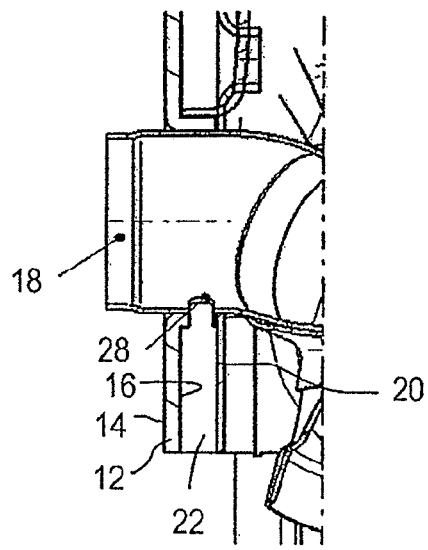
FIG. 2 is a schematic sectional view of a detail of the exemplary exhaust manifold in FIG. 1.

FIG. 1 illustrates an exhaust manifold 10 having a flange 12 which has an engine-side flange surface 14 and a flat opposite flange surface 16. In the mounted condition, the flange surface 14 rests flatly against an engine block of an internal combustion engine (which is not shown).

The flange 14 has several openings located side-by-side. Exhaust pipes 18 aligned with outlets in the engine block project into these openings. In the illustrated embodiment, the pipes 18 extend through the flange 12.

A sheet metal component 20, which is essentially bent in a U-shape, is arranged at the flange 12 in such a manner that the legs of the "U" point to the flange surface 16, while a web situated between the legs is aligned in a spaced manner with respect to the flange surface 16. In this manner, a channel 22 is formed between the sheet metal component 20 and the flange surface 16, which channel 22 extends approximately along the entire length of the flange 12. The web of the "U" is preferably constructed to be generally planar and to extend parallel to the flange surface 16.

Figure 3:
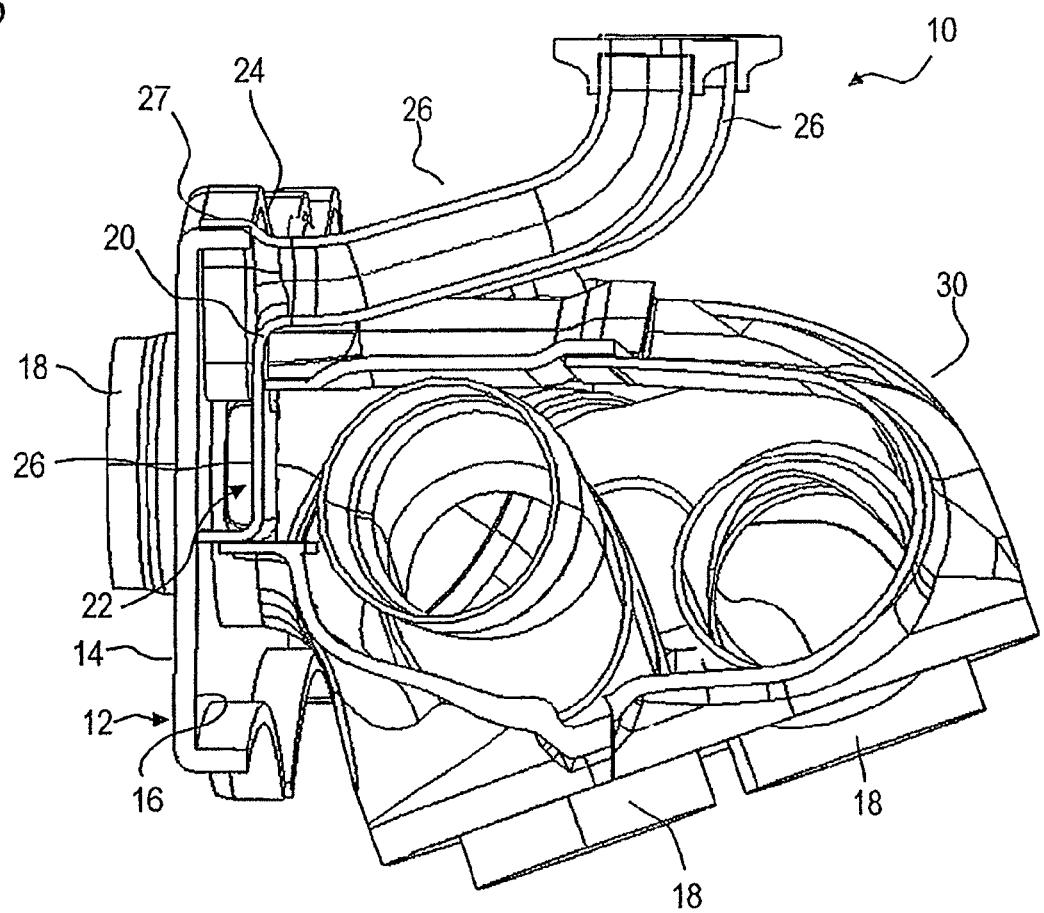
FIG. 3 is a further schematic perspective view of the exemplary exhaust manifold according to the invention.

On the side facing away from the flange surface 16, an attachment 24 for the connection of a fluid line 26 is constructed in the sheet metal component 20, which attachment 24 transitions here into the leg which is at the top in FIGS. 1 and 3. The fluid line 26 therefore leads into the channel 22 on the side facing away from the engine block. By way of this fluid line 26, a suitable fluid, for example, secondary air, is fed into the exhaust pipes 18. Depending on the purpose, a different gaseous or liquid fluid can also be introduced.

In the illustrated example, two fluid lines 26 are provided which lead into the channel 22 in a mutually parallel staggered fashion (see FIG. 3).

The flange 14 has a bent-over edge 27, which projects from the flange surface 16 and points away from the engine block in the mounted state. The sheet metal component 20 extends over the edge 27 with its leg, which is at the top in FIG. 3, and is fastened to this edge 27, for example, by welding or the like. The other leg is welded to the flange 12, for example, at the flange surface 16.

Since the engine block is cooled in the area of the cylinder head, only moderate temperature fluctuations occur in the area of the flange 12 and the flange surface 16, so that also different thermal expansion coefficients of the individual components do not have an interfering effect during a fastening in this area.

In order to feed secondary air into the exhaust pipe or pipes 18, the latter has (have) one opening 28 respectively in the form of a, for example, lateral slot, which is completely situated in the channel 22 so that a direct fluid connection is formed between the interior of the exhaust pipe 18 and the channel 22.

Air flowing in through the fluid line 26 is introduced by way of the channel 22 through the openings 28 into the exhaust pipes 18 and thereby into the exhaust system of the internal-combustion engine. Correspondingly, each of the exhaust pipes 18 to be supplied in this manner has one or more openings 28.

In the illustrated example, the exhaust pipes 18 are surrounded by a multipart outer shell 30 for forming an air gap insulation. The outer shell 30 having the top and bottom shell 32, 34, which overlap one another in a slidable manner, reaches over the sheet metal component 20 on one side of the channel (at the bottom in FIG. 3). In contrast, on the other side of the channel 22, the outer shell 30 ends at the flat web of the sheet metal component 20 in a butt-jointed manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust manifold for an internal combustion engine having an engine block, comprising:
   at least one exhaust pipe;
   a flange of the exhaust manifold operatively configured to be fastenable to the engine block of the internal combustion engine, the flange having a channel on a side facing away from the engine block, wherein the channel is U-shaped and is open in a direction facing away from the engine block;
   a U-shaped sheet metal component configured to extend over the U-shaped channel on the flange side facing away from the engine block, the U-shaped sheet metal component being configured to close off the open U-shaped channel and form a fluid passage therebetween;
   a fluid line operatively connected with the channel; and
   an attachment for connection to the fluid line to the U-shaped sheet metal component,
   wherein
   the attachment is located on a face of the U-shaped sheet metal component facing away from the engine block,
   the fluid line is in fluid communication with an interior of the exhaust pipe via the attachment, the channel and a lateral opening in the exhaust pipe, and
   the fluid line opens into the channel on the side of the flange facing away from the engine block.

2. The exhaust manifold according to claim 1, wherein the channel is operatively configured such that all exhaust pipes extending through the flange extend through the channel.

3. The exhaust manifold according to claim 1, wherein the lateral opening in the exhaust pipe comprises a laterally arranged slot in the exhaust pipe.

4. The exhaust manifold according to claim 2, wherein the lateral opening in the exhaust pipe comprises a laterally arranged slot in the exhaust pipe.

5. The exhaust manifold according to claim 1, further comprising:
   an outer shell configured to provide an air gap insulation with respect to all exhaust pipes surrounded by the outer shell.

6. The exhaust manifold according to claim 5, wherein the sheet metal component forming the channel is arranged within the outer shell.

7. The exhaust manifold according to claim 1, wherein the at least one exhaust pipe extends through the flange in a direction of the engine block.

8. The exhaust manifold according to claim 2, wherein the at least one exhaust pipe extends through the flange in a direction of the engine block.

9. The exhaust manifold according to claim 3, wherein the at least one exhaust pipe extends through the flange in a direction of the engine block.

* * * * *